JOHN CLARK.
Improvement in Piston Packing.
No. 118,843.  Patented Sep. 12, 1871.
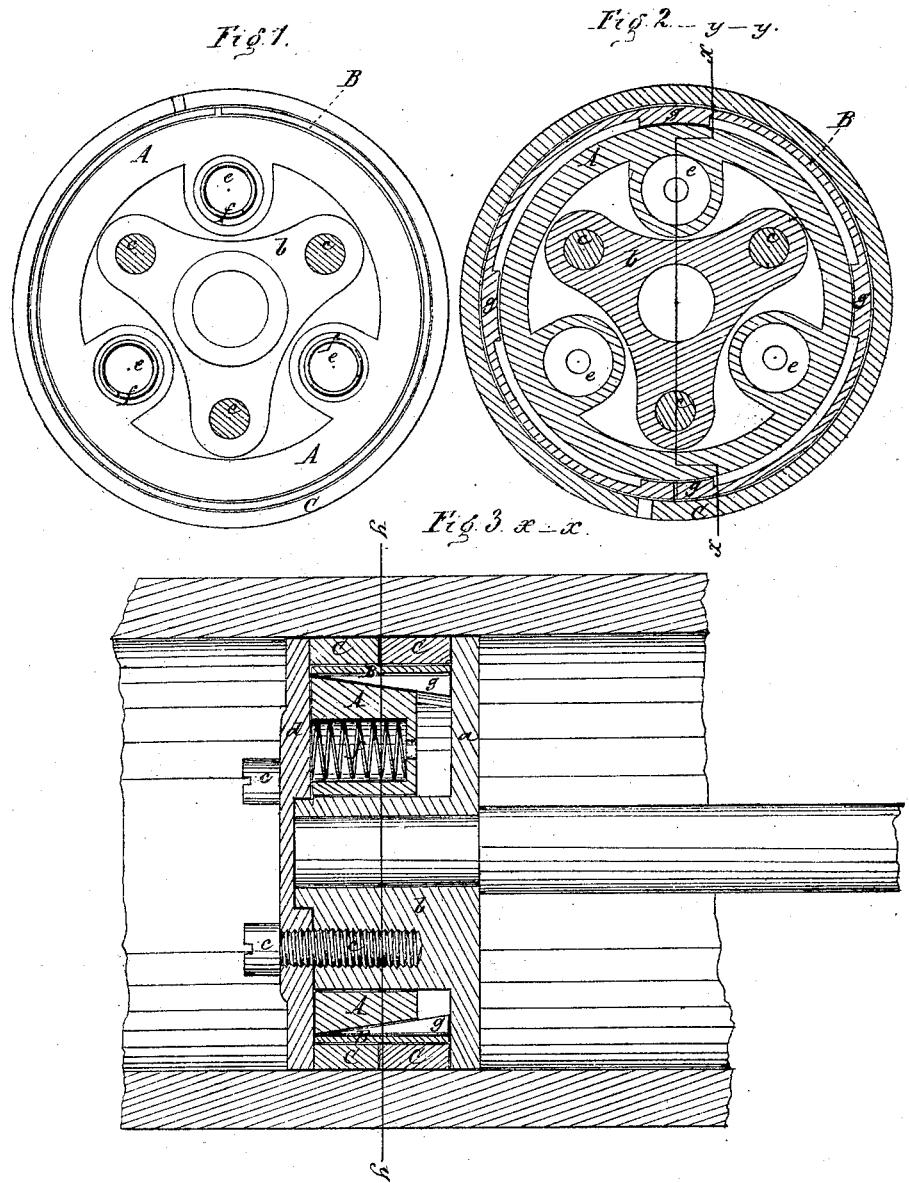

118,843

UNITED STATES PATENT OFFICE.

JOHN CLARK, OF HARRISBURG, PENNSYLVANIA.

IMPROVEMENT IN PISTON-PACKINGS.

Specification forming part of Letters Patent No. 118,843, dated September 12, 1871.

*To all whom it may concern:*

Be it known that I, JOHN CLARK, of Harrisburg, in the county of Dauphin and State of Pennsylvania, have invented a new and useful Improvement in Piston-Packing; and I do hereby declare the following to be a full, clear, and exact description of the same, reference being had to the accompanying drawing making a part of this specification, in which—

Figure 1 is a top view with the follower removed. Fig. 2 is a horizontal section in the line $yy$, Fig. 3; and Fig. 3 is a vertical section in the line $xx$, Fig. 2.

This invention relates to an improvement on the piston-packing for which Letters Patent No. 103,140 were issued me bearing date May 17, 1870.

In the said piston-packing there are set-screws passing through the follower or outer side of the piston-head, and bearing against an annular wedge inclosed within a parted ring having an inner transverse taper, which ring is itself inclosed within the packing-rings, the function of the set-screws being to force the aforesaid wedge into the aforesaid tapering ring so as to expand the latter, and also to expand the packing-rings so as to make a steam-tight joint between the piston and cylinder.

In my present invention I dispense with set-screws and employ, instead, spiral springs placed within recesses formed in the annular wedge, which springs bear against the follower, so that when the latter is moved inward the springs force the wedge into the inclosing-ring with the same effect as the set-screws of my former invention. In my present invention, also, the interior of the ring that incloses the annular wedge is ribbed transversely or parallel with the axis of the piston-head, so that the annular wedge touches only the ribs and not the ring itself, whereby friction is diminished.

Referring to the drawing, $a$ is the front disk of the piston-head, cast solid, with which is a spider, $b$, into which pass the screws $c$ that hold the follower $d$. A is the annular wedge; $e$, the recesses therein; and $f$, the springs placed within the recesses. B is the ring inclosing the annular wedge, and $g$ the ribs on the inside of said ring. C are the packing-rings.

By turning the screws $c$ the follower is moved accordingly, and compresses the springs $f$ within the recesses $e$. This forces the wedge into the ring B, expands the latter, enlarges the packing-rings, and makes a steam-tight joint. The wedge is in contact with no part of the ring B except the ribs $g$. The ring B does not taper except in the ribs $g$, which have an inclination corresponding to that of the wedge A.

Having thus described my invention, what I claim as new, and desire to secure by Letters Patent, is—

The combination of the wedge-ring A, recesses $e$, springs $f$, follower $d$, disk $a$, ring B, ribs $g$, and packing-rings C, all constructed and arranged as shown and described.

JOHN CLARK.

Witnesses:
WALLACE DE WITT,
LAVAN DAUGHERTY.